June 24, 1930.   R. H. HEDGE   1,767,451
FASTENER
Filed May 4, 1927
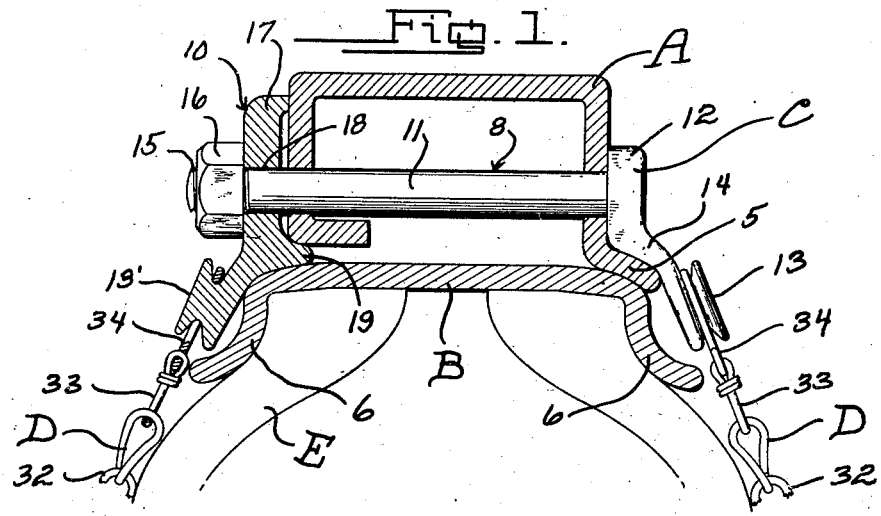
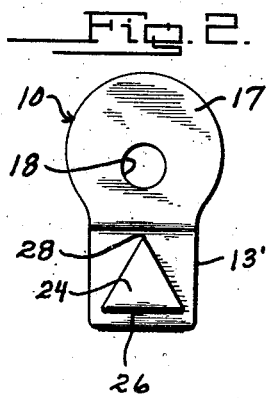
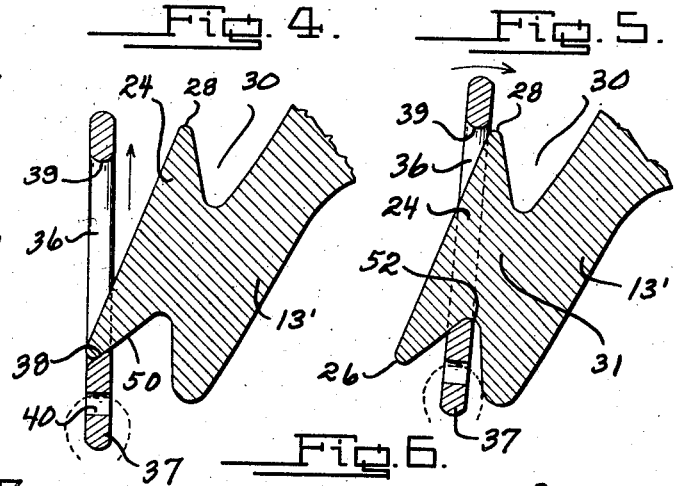
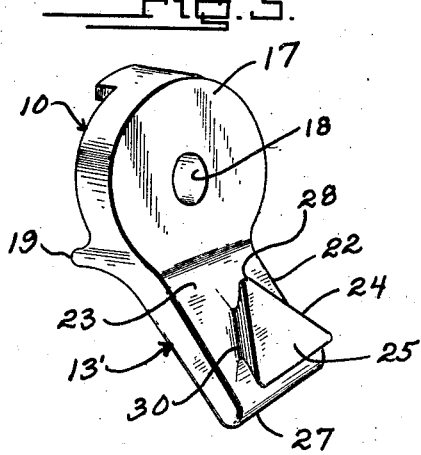
Inventor
Russell H. Hedge
By Lancaster and Allwine
Attorney Patented June 24, 1930

1,767,451

UNITED STATES PATENT OFFICE

RUSSELL H. HEDGE, OF DELTA, IOWA

FASTENER

Application filed May 4, 1927. Serial No. 188,776.

The present invention relates to improvements in wheel constructions of the demountable type and the primary object of the invention is to provide novel means whereby the demountable rim fastening means serves also as an attachment for traction members such as anti-skid chains or mud lugs.

With the present type of anti-skid chains, it quite often occurs as when the vehicle is being driven over muddy roads, that the chains slip circumferentially of the tire and do not afford the required traction for moving the vehicle through the mud. With the spoke type of wheels, it is possible to temporarily secure the chains against circumferential movement with respect to the tire, but with the common type of disc wheels no means is afforded whereby the chain may be conveniently secured so that the wheel will not spin in the chain.

It is therefore a further object of this invention to provide a combined rim clamp and chain fastener serving both to secure the demountable rim upon the wheel felly and also as an attaching point for the chain or lug so as to prevent circumferential movement of the same with respect to the wheel.

A further object of the invention is to provide a novel skid chain or mud lug attaching means embodying features whereby the anti-skid devices may be easily applied and effectively held in position against accidental disconnection and sliding movement circumferentially of the wheel with which they are associated.

A further object of the invention is to provide a novel rim clamping means embodying hook portions of special formation, and which hook portions afford a convenient place of attachment for novelly formed fasteners carried by the chain or mud lugs.

A still further and important object of the invention is to provide a device of this character which is of extremely simple and durable construction and which device may be readily associated with existing types of wheel constructions of that type embodying a demountable rim.

Other objects and advantages of the invention will be apparent during the course of the following detailed description, taken in connection with the accompanying drawing forming a part of this specification and in which drawing:

Figure 1 is a fragmentary transverse section through the felly and rim of a conventional type of wheel construction and showing the improved device as applied thereto.

Figure 2 is a face plan view of the outer side of the wedge lug.

Figure 3 is a perspective view of the wedge lug or member forming a part of the rim clamp.

Figure 4 is an enlarged fragmentary sectional view through one of the chain attaching portions and showing the position of a chain fastener when being applied to the rim clamp.

Figure 5 is a view similar to that illustrated in Figure 4 but showing the chain fastener having been moved to a position whereby the same may be swung to a location behind the hook or keeper.

Figure 6 is an enlarged face plan view of one of the chain attaching portions of the rim clamp and showing the construction of the chain fastener as applied thereto.

Referring to the drawing in detail and wherein similar reference characters designate corresponding parts throughout the several views, the letter A designates a conventional type of metallic wheel felly for detachably receiving a demountable tire carrying rim B, C the improved combined rim clamp and chain fastener associated with the wheel felly A for serving as a retention means for the demountable rim B, and D an anti-skid or traction means for the tire E and having detachable connection with the structure C at opposite sides of the tire rim B.

The felly A may of course be of any construction such as of wood, in place of the metallic felly shown, and in the example shown the felly A is provided at its inner edge with an angular flange 5 against which the inner edge of the rim B seats in the usual manner, the rim B being provided at each edge with the usual flanges 6 for receiving the beads of the tire E.

Referring now to the specific construction of the device C, the same embodies a rim bolt 8 and a wedge lug or member 10. The rim bolt 8 embodies a shank portion 11 which is intended to extend transversely through the felly A in parallel alignment with the wheel axis, and provided at the inner end of the shank 11 is a head 12 which rests against the inner edge of the felly, and which head is formed with a chain attaching portion 13 which projects from one side of the head 12 to overlying relation with the inner flange 6 of the tire rim B. The head 12 and chain attaching portion 13 are connected by an angularly offset portion 14 which preferably engages the felly flange 5 in a manner as to prevent rotation of the rim bolt from a position wherein the chain attaching portion 13 extends from the head 12 in a radial direction from the wheel axis. It is preferred that the shank 11, head 12, and chain attaching portion 13 be of one piece construction. The outer end of the shank 11, which extends beyond the outer side of the felly A, is threaded as at 15 for threaded reception of a suitable retaining nut 16.

Referring now to the wedge lug or member 10 and which is intended to be disposed at the outer side of the felly A, the same embodies a head portion 17 provided with a suitable opening 18 through which the bolt shank 11 extends, and a chain attaching portion 13' which when the lug 10 is in position upon the bolt shank 11 extends in overlying relation with the outer tire rim flange 6. Extending transversely of the lug 10 and from the inner side thereof at a location adjacent the juncture of the head 17 and portion 13', is a wedge shaped tongue 19 which is intended to be passed between the felly A and rim B for rigidly mounting the rim upon the felly in the well known manner. This transversely extending tongue 19 by reason of its engagement between the felly and tire rim, serves to prevent rotation of the lug upon the bolt shank 11 and thus retains the chain attaching portion 13 in overlying relation to the outer rim flange 6.

Since each of the chain attaching portions 13 and 13' are of identical formation, it is believed that a full description of the particular formation of the chain attaching portion 13' will suffice for gaining a clear understanding of the novel features of the combined rim clamp and chain fastener.

Each of the chain attaching portions 13 and 13' embodies a substantially rectangular shaped base plate 22, and formed integral therewith and projecting from the outer face 23 thereof, is a triangular shaped hook or keeper 24 the outer triangular shaped face 25 of which preferably extends in a plane parallel with the face 23 of the base plate 22.

This triangular shaped keeper 24 is of less dimension than the area of the base plate face 23 as clearly illustrated in Figures 2 and 6, and is arranged with its base edge 26 adjacent the free end 27 of the base plate, and with the apex 28 disposed adjacent the head 17 of the lug. This triangular shaped keeper 24 is grooved at its three edges as at 30 between the faces 23 and 25 for forming a reduced triangular shaped neck portion 31 having its three side edges extending parallel with the edges of the triangular shaped face 25.

Referring now to the anti-skid device D and which is intended to be detachably associated with the structure C, the same embodies a tread section 32 which in the example shown is of chain formation, and this tread section 32 may either be in the form of mud lugs adapted to encircle the tire E transversely and have its opposite ends connected with the keepers 24, or be in the form of a tread chain embodying side chains and cross link sections. Coupled to the tread section 32 as by means of suitable connectors 33, are chain fastening members 34 which may be readily stamped from a suitable gauge of sheet metal. These chain fastening members 34 are of substantially triangular shape in outline and are provided with a triangular shaped opening 35 forming angularly disposed arms 36 which are joined at the apex of the triangular shaped fastening member, and connected at their divergent ends by a base portion 37 of a width substantially greater than that of the arms 36. The lower edge of the triangular shaped opening 35 is preferably bevelled outwardly and downwardly as at 38 for a purpose to be subsequently explained, and this opening 35 is of a height from the edge 38 to the apex 39, substantially less than the distance between the base edge 26 and apex 28 of the triangular shaped keeper 24. The relatively wide base portion 37 of the fastening member is provided with suitable apertures 40 which may be struck from the metal during formation of the fastening members, and these openings 40 are intended to receive the terminal portions of wire like connectors 33 which form loops for receiving the links of the tread section 32.

When applying the fastening members 34 in position upon the triangular shaped keepers 24, the members are first placed in a position as illustrated in Figure 4 with the inclined edge 38 engaging the inclined surface 50 of the groove 30 behind the base portion of the keeper, and then slid upwardly in the direction of the arrow until the inclined edge 38 seats in the crotch 52 as illustrated in Figure 5. When in this position as illustrated in Figure 5, the crown or apex portion 39 of the triangular shaped opening 35 is spaced slightly above the apex 28 of the triangular shaped keeper 24 and by then swinging the member 34 in the direction of the arrow the upper end of the arms 36 may be moved over the point 28 so that upon release of the fastening member the same will move into a position as illustrated in Figure 6, and in which position the member 34 is held against accidental movement off the keeper 24. When desiring to remove the fastening members from the keeper it is merely necessary to move the members to a position whereby the inclined edge 38 engages the crotch 52 and then swing the upper portion of the members over the point 28. By so having the edge 38 inclined as shown, it will be seen that such allows for the opening 35 to be of less height than would be required were the edge 38 at a right angle to the face of the fastening member.

Thus it will be seen that by reason of the bolt shank 11 preventing movement of the chain attaching portions 13 and 13' circumferentially of the wheel felly, that the tread section 32 will be held against circumferential movement with respect to the tire E.

From the foregoing description it will be apparent that a novel and efficient combined rim clamp and chain fastener has been provided wherein the chain attaching portions of the rim clamp are held in a set relation with respect to the wheel felly, and embodying a novel arrangement whereby the antiskid means for the wheel may be easily and effectively coupled and disconnected from the rim clamp without the aid of special tools, and one wherein the anti-skid device is prevented from moving circumferentially with respect to the tire. It will also be apparent that a novel and practical device of this character has been provided which may be readily associated with existing types of wheel construction of the demountable tire rim type.

Changes in the shape, size and arrangement of parts may be made to the specific form of the invention herein shown and described, without departing from the spirit of the invention or the scope of the following claims.

I claim:

1. In a device of the class described, a chain attaching lug including a chain attaching portion having a triangular shaped keeper formed on its outer face and forming a triangular shaped groove, and a chain fastening member for detachable connection with the keeper, provided with a triangular shaped opening having an outwardly and downwardly beveled lower edge, said opening being of less height than that of the face of the triangular shaped keeper.

2. In a device of the class described, a chain attaching member including a chain attaching portion having a triangular shaped keeper formed on its outer face with the three edges of the keeper channeled providing a triangular-shaped groove, and a chain fastening member for detachable connection with the keeper, embodying a triangular-shaped member provided with a triangular-shaped opening of less height than that of the face of the triangular-shaped keeper.

RUSSELL H. HEDGE.